US007870487B2

(12) United States Patent
Bauman et al.

(10) Patent No.: US 7,870,487 B2
(45) Date of Patent: Jan. 11, 2011

(54) INSERTING INTO A DOCUMENT A SCREEN IMAGE OF A COMPUTER SOFTWARE APPLICATION

(75) Inventors: Brian Bauman, Austin, TX (US); Amanda Jane Burton, Austin, TX (US); Michael Pierre Carlson, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1925 days.

(21) Appl. No.: 10/902,590

(22) Filed: Jul. 29, 2004

(65) Prior Publication Data

US 2006/0026561 A1 Feb. 2, 2006

(51) Int. Cl.
*G06F 3/00* (2006.01)
*G06F 17/00* (2006.01)

(52) U.S. Cl. ...................................... 715/704; 715/243
(58) Field of Classification Search ................. 715/704, 715/760, 241, 709, 714, 243
See application file for complete search history.

(56) References Cited

U.S. PATENT DOCUMENTS

| 5,745,738 | A | * | 4/1998 | Ricard | 703/13 |
|---|---|---|---|---|---|
| 5,958,008 | A | | 9/1999 | Pogrebisky et al. | |
| 6,181,838 | B1 | | 1/2001 | Knowlton | |
| 6,662,226 | B1 | | 12/2003 | Wang et al. | |
| 6,667,747 | B1 | * | 12/2003 | Spellman et al. | 715/714 |
| 6,668,273 | B1 | | 12/2003 | Rust | |
| 7,036,079 | B2 | * | 4/2006 | McGlinchey et al. | 715/704 |
| 2005/0060655 | A1 | * | 3/2005 | Gray et al. | 715/745 |

OTHER PUBLICATIONS

Cowert, Robert. "Mastering Windows 3.1, Special Edition." 1993. SYBEX Inc. p. 421-428.*
Maselli, et al.; Incorporating Screen Captures in Multi-Language Technical; Jan. 2004; pp. 1-10; USA.

* cited by examiner

*Primary Examiner*—Kieu Vu
*Assistant Examiner*—Blaine T. Basom
(74) *Attorney, Agent, or Firm*—H. Barrett Spraggins; Justin Dillon; Biggers & Ohanian, LLP (57) ABSTRACT

Inserting into a document at least one screen image of a computer software application including inserting a macro at a location in the document for the screen image, the macro including instructions for navigating the computer software application to the screen image and for capturing the screen image and executing the macro. In typical embodiments, inserting a macro at a location in the document for the screen image also includes navigating the computer software application to the screen image by a user's operations of user interface controls and capturing the user's operations of user interface controls as instructions for navigating the computer software application to the screen image. Typical embodiments also include executing the macro by navigating the computer software application to the screen image and storing the screen image in computer memory. Executing the macro may include executing the macro for a language in dependence upon regional configuration settings.

20 Claims, 7 Drawing Sheets

INSERTING INTO A DOCUMENT A SCREEN IMAGE OF A COMPUTER SOFTWARE APPLICATION

BACKGROUND OF THE INVENTION

1. Field of the Invention

The field of the invention is data processing, or, more specifically, methods, systems, and products for inserting into a document a screen image of a computer software application.

2. Description of Related Art

When building technical documents such as computer software application documentation in multiple languages, it is very expensive and laborious to include any content that includes graphic images that contain text that must be translated. One approach the industry has taken is to separate the graphic content from the text content, although that approach does not yield good results from a usability perspective.

Another approach the industry has taken is to simply exclude graphic images from documentation publications. This approach has been motivated primarily because of cost and schedule pressures. As a computer product undergoes test, any changes in screen images of the product require changes in the translated documentation content, thus having adverse impact on the product's delivery schedule. Although not having (or minimizing) any graphic content in documents certainly reduces the translation expense, it has been shown in many cases that usability has also suffered as a result of having only text and no graphics content.

Another approach taken by some in the Information Development community as formulated in the Technical Report entitled "Incorporating Screen Captures in Multi-language Technical" by Kimberlee C. Maselli, et al. is to re-render screen-captured images (usually in jpg format), using software that provides a layered separation of the graphics from the textual content, and to simply translate the textual content. This solution offers improved options to Information Developers, but it does not take into account screen layout changes required by newly translated text, text bidirectionality requirements, or even the length of the translated text. There is ongoing need in the art for improvements for including screen images in documentation for computer products.

SUMMARY OF THE INVENTION

Methods, systems, and products are disclosed for inserting into a document at least one screen image of a computer software application that include inserting a macro at a location in the document for the screen image. In typical embodiments, the macro includes instructions for navigating the computer software application to the screen image and for capturing the screen image. In typical embodiments, inserting a macro at a location in the document for the screen image includes navigating the computer software application to the screen image by a user's operations of user interface controls and capturing the user's operations of user interface controls as instructions for navigating the computer software application to the screen image. In typical embodiments, inserting a macro at a location in the document for the screen image may be carried out by a user's entering, in the document at the location, the instructions for navigating the computer software application to the screen image.

Typical embodiments also include executing the macro. In typical embodiments, executing the macro includes navigating, according to the macro, the computer software application to the screen image and storing the screen image in computer memory. In typical embodiments, executing the macro also includes executing the macro for a language in dependence upon regional configuration settings.

Many embodiments include developing the computer software application. In such embodiments, executing the macro may include executing the macro when the computer software application is developed. Many embodiments include installing the computer software application. In such embodiments, executing the macro may include executing the macro when the computer software application is installed. Many embodiments include running the computer software application. In such embodiments, executing the macro may include executing the macro when the computer software application is run.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for inserting into a document a screen image of a computer software application. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DETAILED DESCRIPTION

Figure 1:
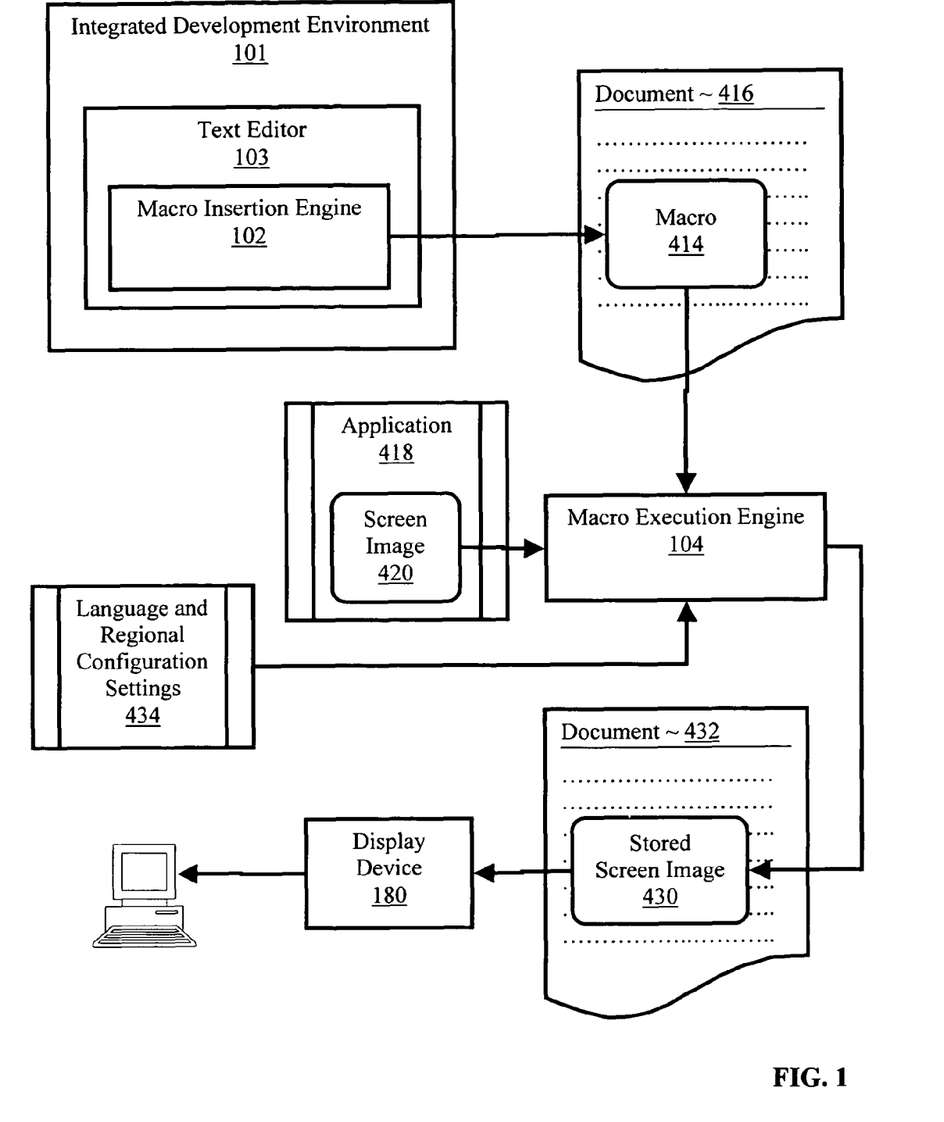
FIG. 1 sets forth a block diagram of an exemplary system for inserting into a document a screen image of a computer software application.

Exemplary methods, systems, and computer program products for inserting into a document a screen image of a computer software application according to embodiments of the present invention are described with reference to the accompanying drawings, beginning with FIG. 1. FIG. 1 sets forth a block diagram of an exemplary system for inserting into a document a screen image of a computer software application according to embodiments of the present invention. The system of FIG. 1 includes a macro insertion engine (102). A macro insertion engine is a software module according to embodiments of the present invention that is capable of inserting a macro (414) at a location in a document (416) for a screen image (420). The macro (414) includes instructions for navigating the computer software application (418) to the screen image (420) and for capturing the screen image (420, 430). Instructions for navigating the computer software application (418) to the screen image (420) and for capturing the screen image (420, 430) may be implemented in text form, including, for example, instructions encoded in a computer language or source code format, such as Microsoft's Visual Basic™, C, C++, Java™, and the like, in a markup language such as SGML (the Standard Generalized Markup Language) or XML (the eXtensible Markup Language), in binary format, or in other ways as will occur to those of skill in the art.

The macro insertion engine (102) of FIG. 1 is installed in an integrated develop environment (101). An integrated development environment ("IDE") is a programming environment integrated into a software application that provides a graphical user interface ("GUI") builder, a text or code editor, a compiler and/or interpreter and a debugger. Examples of IDEs include Microsoft's Visual Studio™ and Frontpage™, Borland's Delphi™ and JBuilder™, Macromedia's DreamWeaver™, the open-source IDEs known as Eclipse and Netbeans, and IBM's Websphere Application Studio Developer™ ("WASD"). In the example of FIG. 1, the macro insertion engine (102) is installed, either by addition at the source code level or through a plug-in, for example, in a text editor (103) that has under edit a document (416) that is developed as part of the documentation for a computer software application (418). Documentation for such a computer software application may include operations manuals, system manuals, on-line 'Help' documentation, and so on, all of which may benefit from appropriate insertion of screen images from the application at pertinent locations in the documentation.

In the example of FIG. 1, a user developing documentation for application (418) may place an editing cursor in document (416) at a location in the document where a screen image of the application is to be placed. The macro insertion engine (102) operates, while a user navigates the computer software application (418) to a screen image (420) through user operation of user interface controls, by capturing the user's operations of user interface controls as instructions for navigating the computer software application to the screen image. User interface controls keyboard operations, cursor movements, mouse operations, other GUI pointer operations, and so on, as will occur to those of skill in the art. Because macros are typically implemented as text encodings of user interface controls, however, some systems for inserting into a document a screen image of a computer software application according to embodiments of the present invention support inserting a macro at a location in a document for a screen image by allowing a user to enter as text through a text editor, in the document at the location, the instructions for navigating the computer software application to the screen image.

The system of FIG. 1 also includes a macro execution engine (104) that operates to execute the macro (414) by carrying out the instructions for operations of user interface controls that comprise the macro. More particularly, the macro execution engine (104) in the system of FIG. 1 is a software module programmed according to embodiments of the present invention to scan through a document containing macros for inserting into a document a screen image of a computer software application. When the macro execution engine finds such a macro, the macro execution engine follows in the macro instructions to navigate through the screens of computer software application (418) to a particular screen image (420) that is the target of the macro, retrieve that screen image from display memory, and store the screen image (430) in computer memory. In FIG. 1, the stored screen image (430) is shown stored in the document (432) under edit, but that is not a limitation of the invention. The stored screen image (430) may be stored in clipboard memory, in a file on a file system, or otherwise as will occur to those of skill in the art. Showing the stored screen image (430) in the document (432) under edit, however, does aid in the explanation that when the document is eventually rendered, displayed (180) or printed as part of application documentation, for example, the stored screen image (430) appears at its proper location in the document as rendered.

In the system of FIG. 1, the macro execution engine (104) operates for a language in dependence upon regional configuration settings (434). Examples of regional configuration settings include date syntax, currency symbol, font, and others as will occur to those of skill in the art. Font will vary with language, so that if the language is German, the font will include characters with umlauts, if the language is French, the font will include accent grave, and so on. Language and regional configuration settings may change between invocations of the macro execution engine. An initial set of documentation for an application may be developed in English, for example. Then later the language and regional settings may be reset to support German, so that the operation of the macro execution engine will operate against a version of a source document (416) in German and stored screen images (430) will have GUI labels and dialogue box text in German. In this way, a basic set of documentation may be developed in any base language and then many different forms of the documentation may be generated merely by varying the language and regional configuration settings (434) and re-invoking the operation of the macro execution engine (104).

The macro execution engine (104) may be invoked to execute macros in a document and insert screen images when the corresponding application is developed, in which case the macro execution engine (104) may be incorporated into an IDE along with a macro insertion engine, for example. Or the macro execution engine (104) may be invoked to execute macros in a document and insert screen images when the corresponding application is installed, in which case the macro execution engine (104) may be incorporated into an installation script or installation wizard, for example. Or the macro execution engine (104) may be invoked to execute macros in a document and insert screen images when the corresponding application is run, in which case the macro execution engine (104) may be incorporated into the application itself, either programmed in at the source code level or through a plug-in, for example.

Storing the screen image in the document under edit optionally, but not necessarily, may include replacing the macro at the location of the screen image. Alternatively, two or more versions of the document are developed, one containing the macro or macros, and others containing the screen image or images. In this way, when many versions of documentation are developed according to changes in language or regional configuration settings, the underlying document containing the macros may remain unchanged.

As mentioned above, inserting into a document a screen image of a computer software application according to embodiments of the present invention is generally implemented with computers, that is, with automated computing machinery. For further explanation, FIG. 2 sets forth a block diagram of exemplary automated computing machinery comprising a computer (134) useful for inserting into a document a screen image of a computer software application according to embodiments of the present invention. The computer (134) of FIG. 2 includes at least one computer processor (156) or 'CPU' as well as random access memory (168) ("RAM").

Stored in RAM (168) is an operating system (154). Operating systems useful in computers according to embodiments of the present invention include Unix™, Linux, Microsoft NT™, and many others as will occur to those of skill in the art. Operating system (154) in the example of FIG. 2 is shown in RAM (168), but many components of an operating system typically are stored in non-volatile memory (166) also.

Also stored in RAM (168) is an integrated development environment (101) containing a macro insertion engine (102) for inserting a macro (414) into a document (416) containing documentation for a computer software application (418). The integrated development environment (101) includes also a macro execution engine for capturing, according to the macro, screen images from the application (418) and storing them either in document (416)—or in another version of the documentation for the application—in RAM or in non-volatile computer memory.

Figure 2:
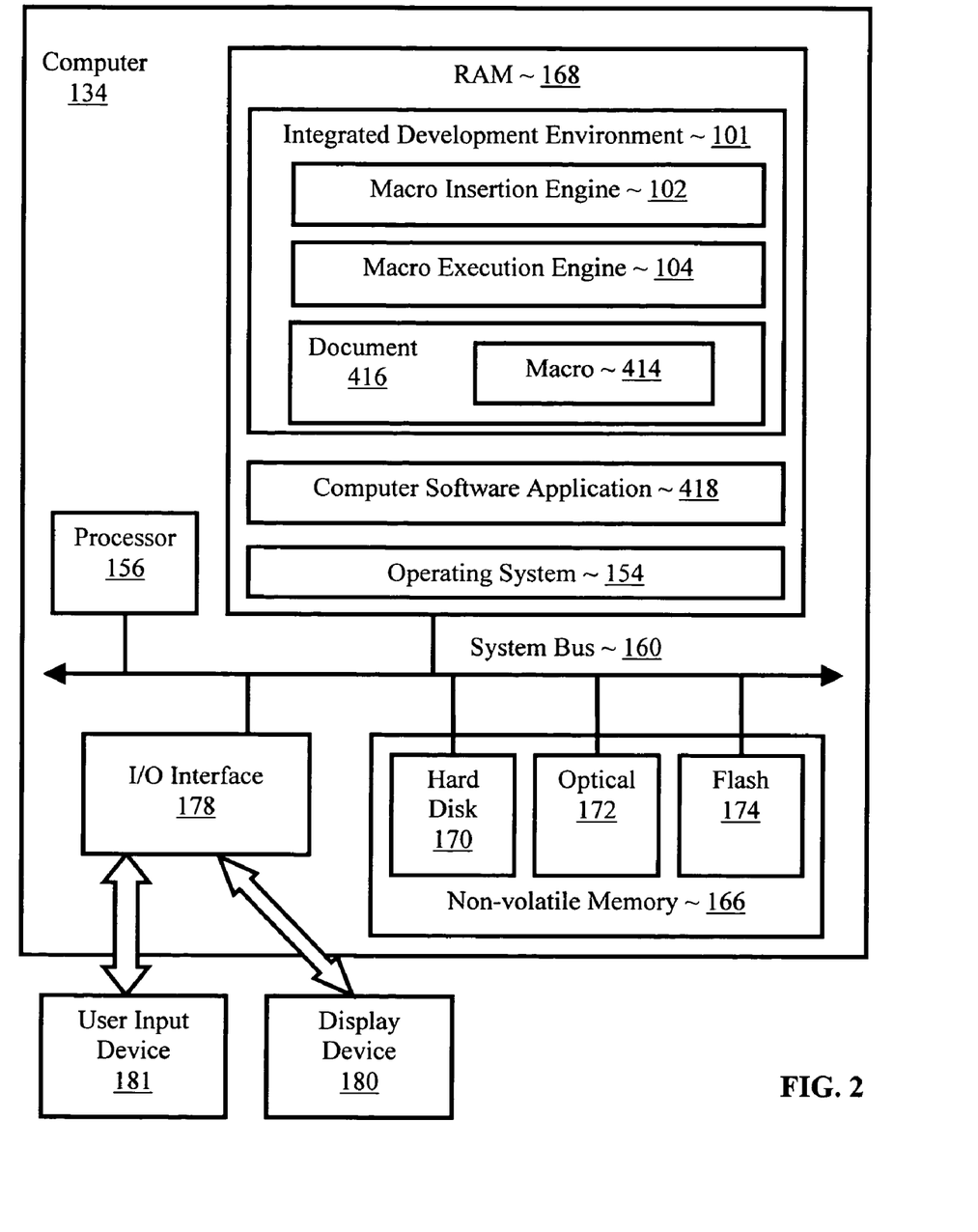
FIG. 2 sets forth a block diagram of exemplary automated computing machinery useful for inserting into a document a screen image of a computer software application.

The computer (134) of FIG. 2 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 3:
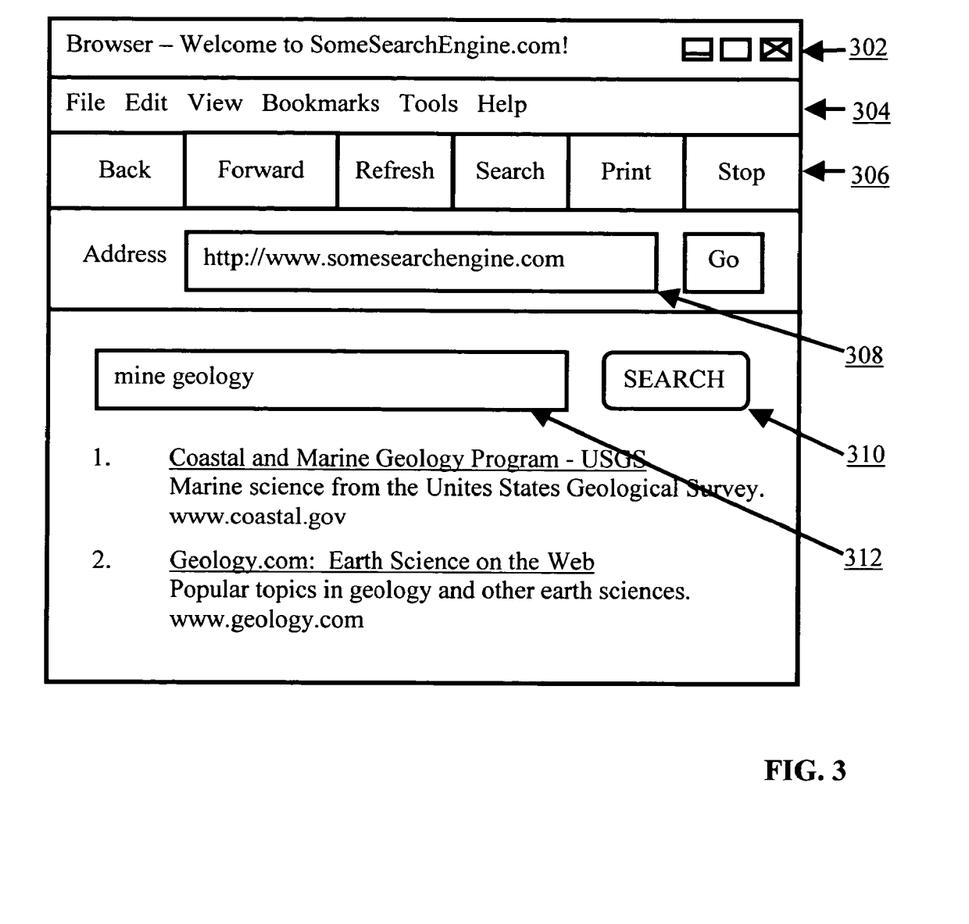
FIG. 3 is a line drawing illustrating an exemplary screen image of a computer software application.

For further explanation, FIG. 3 is a line drawing illustrating an exemplary screen image implemented with a graphical user interface ('GUI') of a computer software application, in this example, a browser. The browser of FIG. 3 is an example of a computer software application having screen images to be inserted into documents according to embodiments of the present invention. The example of FIG. 3 is taken as a browser for convenience of explanation, not for limitation. In fact, many computer software applications have screen images to be inserted into documents according to embodiments of the present invention, including, for example, spreadsheet applications, word processing applications, email applications, database management applications, and others as will occur to those of skill in the art.

The browser of FIG. 3, as depicted, has been navigated to point to a website named "SomeSearchEngine.com," as shown in the title bar of the browser display (302). The browser of FIG. 3 includes a GUI toolbar (306) with a Back button, a Forward button, and buttons for refreshing the display, searching, printing, and stopping web page retrievals. The browser of FIG. 3 also includes a horizontal menu (304) containing the menu items File, Edit, View, Bookmark (called 'Favorites' on some browsers), Tools, and Help. The displayed web page also includes hyperlinks to resources identified and returned by the website SomeSearchEngine.com in response to a search query 'mine geology.'

The following is an example of a macro capable of navigation the browser of FIG. 3 to the web page displayed and storing the displayed screen image:

```
<macro>
    <runApplication id="Mozilla">
    <dataFieldEntry id="Address">
        http://www.somesearchengine.com
    </dataFieldEntry id="Address">
    <invokeFunction id="Go">
    <dataFieldEntry id="Query">
        mine geology
    </dataFieldEntry id="Query">
    <invokeFunction id="Search">
    <storeScreenImage id="aFileSystemPath/aFileName.tif">
</macro>
```

This macro is expressed for purposes of explanation in XML-style syntax, although that is not a limitation of the present invention, and macros may be expressed according to embodiments of the present invention in XML, SGML, computer programming languages, and otherwise as will occur to those of skill in the art. This macro includes an instruction name 'runApplication' that identifies the application to be run as a well-known browser named Mozilla™. The 'runapplication' instruction either runs Mozilla or, if Mozilla, is already running, shifts GUI focus to Mozilla. The macro includes an instruction named 'dataFieldEntry' that identifies a field named 'Address' as a field for data entry. The 'dataFieldEntry' instruction places a data entry cursor in the Address field (308) and enters the text data "http:www.somesearchengine.com." The macro includes an instruction named 'invokeFunction' that identifies the function named 'Go,' represented on the GUI by the button named 'Go,' as an application function to be invoked. The 'invokeFunction' instruction invokes the Go function, navigating the browser in this example to a search engine web site named 'somesearchengine.com.'

The macro includes a second instruction named 'dataFieldEntry' that identifies a field named 'Query' as a field for data entry. This second 'dataFieldEntry' instruction places a data entry cursor in the Query field (312) of the search engine and enters the query string "mine geology." The macro includes a second instruction named 'invokeFunction' that identifies the function named 'Search,' represented on the GUI by the button (310) named 'Search,' as an application function to be invoked. The second 'invokeFunction' instruction invokes the Search function of the search engine, navigating the browser to the illustrated web page, resulting in the illustrated screen image of FIG. 3.

The macro also includes an instruction named 'store-screenImage' that identifies a file named 'aFileName.tif' located on a file system in a subdirectory named 'aFileSystemSubdir' in which the screen image is to be stored. The instruction 'storeScreenImage' stores the screen image in the file named 'aFileName.tif' and records a reference to the filename in a document under edit at the location of the macro. In typical systems according to embodiments of the present invention, the macro is not included at that location, leaving only the reference to the file. The reference to the file is made in a format required by the text editor under which the document is edited—so that the format varies from editor to editor. Some editors may support in-line insertion of screen images, and for those that do, the form of the 'storeScreenimage' instruction may exclude the identification of a filename. Alternatively, even for editors that do require filename references, a macro execution engine may automatically generate a filename, in which case also the form of the 'storeScreenImage' instruction may exclude the identification of a filename.

In summary, this exemplary macro when executed:
checks whether the browser is running, runs the browser if the browser is not running, changes focus to the browser if the browser is already running,
enters the URL "http://www.somesearchengine.com" in the browser's Address field,
invokes the browser's Go function to navigate the browser to the search engine web site named "somesearchengine.com,"
enters the query string "mine geology" in the search engine's query field,
invokes the search engine's Search function, and
stores the screen image in an image file having a filename and stores in the document under edit at the location indicated by the macro a reference to the image file.

Figure 4:
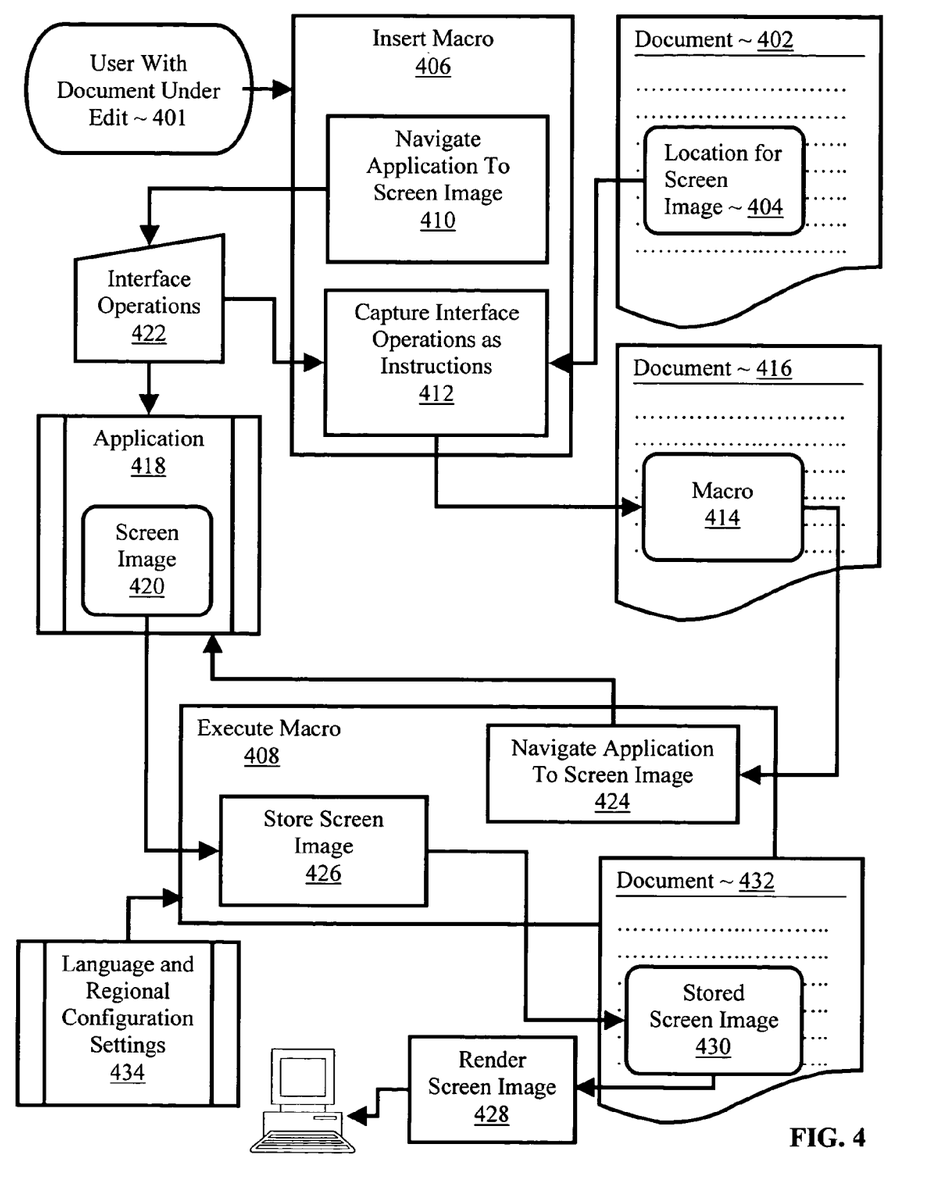
FIG. 4 sets forth a flow chart illustrating an exemplary method for inserting into a document at least one screen image of a computer software application.

For further explanation, FIG. 4 sets forth a flow chart illustrating an exemplary method for inserting into a document at least one screen image of a computer software application that includes inserting (406) a macro (414) at a location (404) in the document (402, 416) for the screen image (420), the macro (414) comprising instructions for navigating the computer software application (418) to the screen image (420) and for capturing the screen image.

As shown in FIG. 4, inserting (406) a macro at a location in the document for the screen image may be carried out by navigating (410) the computer software application (418) to the screen image (420) by a user's operations of user interface controls (422) and capturing (412) the user's operations of user interface controls (422) as instructions for navigating the computer software application to the screen image. Alternatively, inserting (406) a macro at a location in the document for the screen image further comprises entering by a user, as through a text editor, in the document at the location, the instructions for navigating the computer software application to the screen image.

The method of FIG. 4 also includes executing (408) the macro (414). As shown in FIG. 4, executing (408) the macro may be carried out by navigating (424), according to the macro, the computer software application (418) to the screen image (420) and storing (426) the screen image (430) in computer memory. The method of FIG. 4 also includes rendering (428) the screen image at the location in the document for the screen image. In FIG. 4, rendering (428) the screen image at the location in the document for the screen image is illustrated as a rendering to a computer screen, as part of a 'Help' system, for example, although rendering may also include printing documentation containing screen images (430) as well as other forms of rendering such documentation and images as will occur to those of skill in the art. In the example of FIG. 4, executing (408) the macro further comprises executing the macro for a language in dependence upon regional configuration settings (434).

Figure 5:
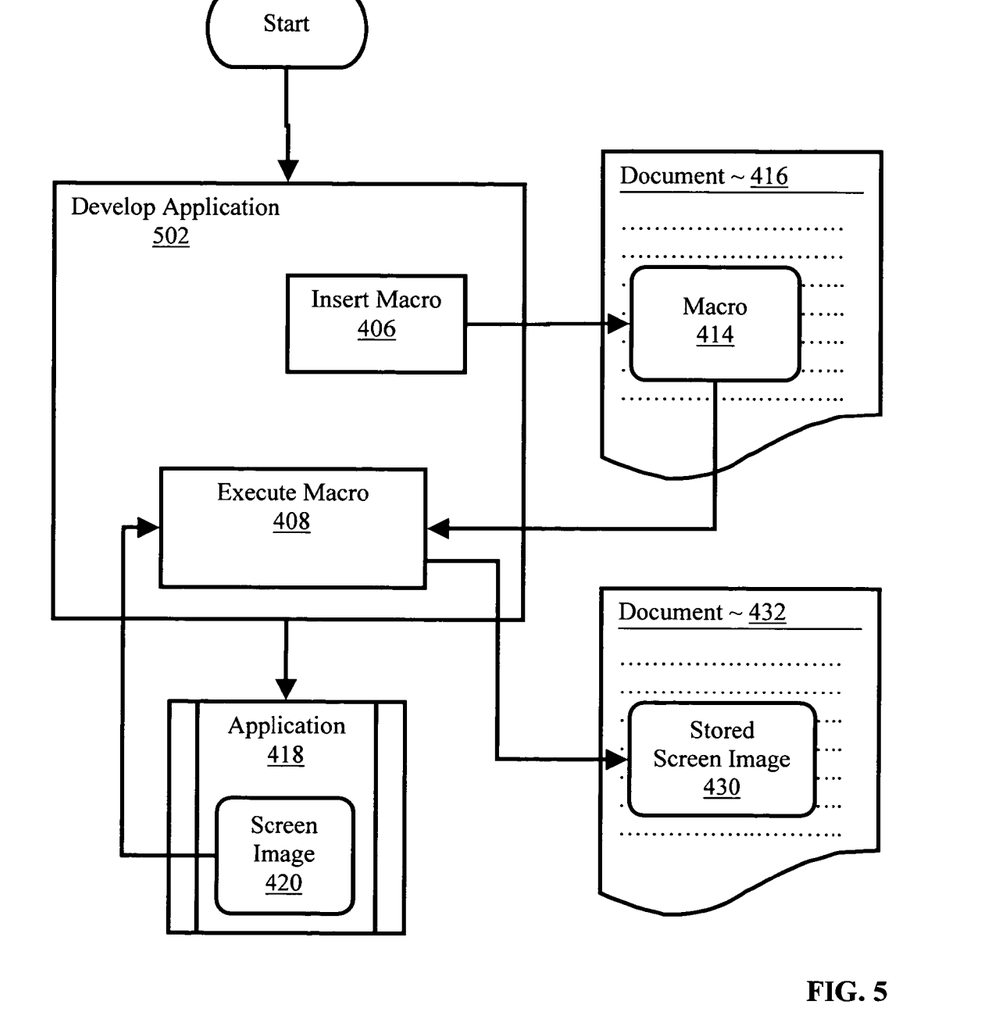
FIG. 5 sets forth a flow chart illustrating a further exemplary method for inserting into a document at least one screen image of a computer software application.

For further explanation, FIG. 5 sets forth a flow chart illustrating a further exemplary method for inserting into a document at least one screen image (420, 430) of a computer software application (418) that includes inserting (406) a macro (414) at a location in the document (416) for the screen image (420) and executing (408) the macro (414) to navigate to, capture, and store a screen image (420, 430) in a document (416). The method of FIG. 5 also includes developing (502) the computer software application, and, in the example of FIG. 5, executing (408) the macro is carried out by executing the macro when the computer software application is developed. In the example of FIG. 5, executing (408) the macro may be implemented as a method aspect of a macro execution engine incorporated in an IDE.

Figure 6:
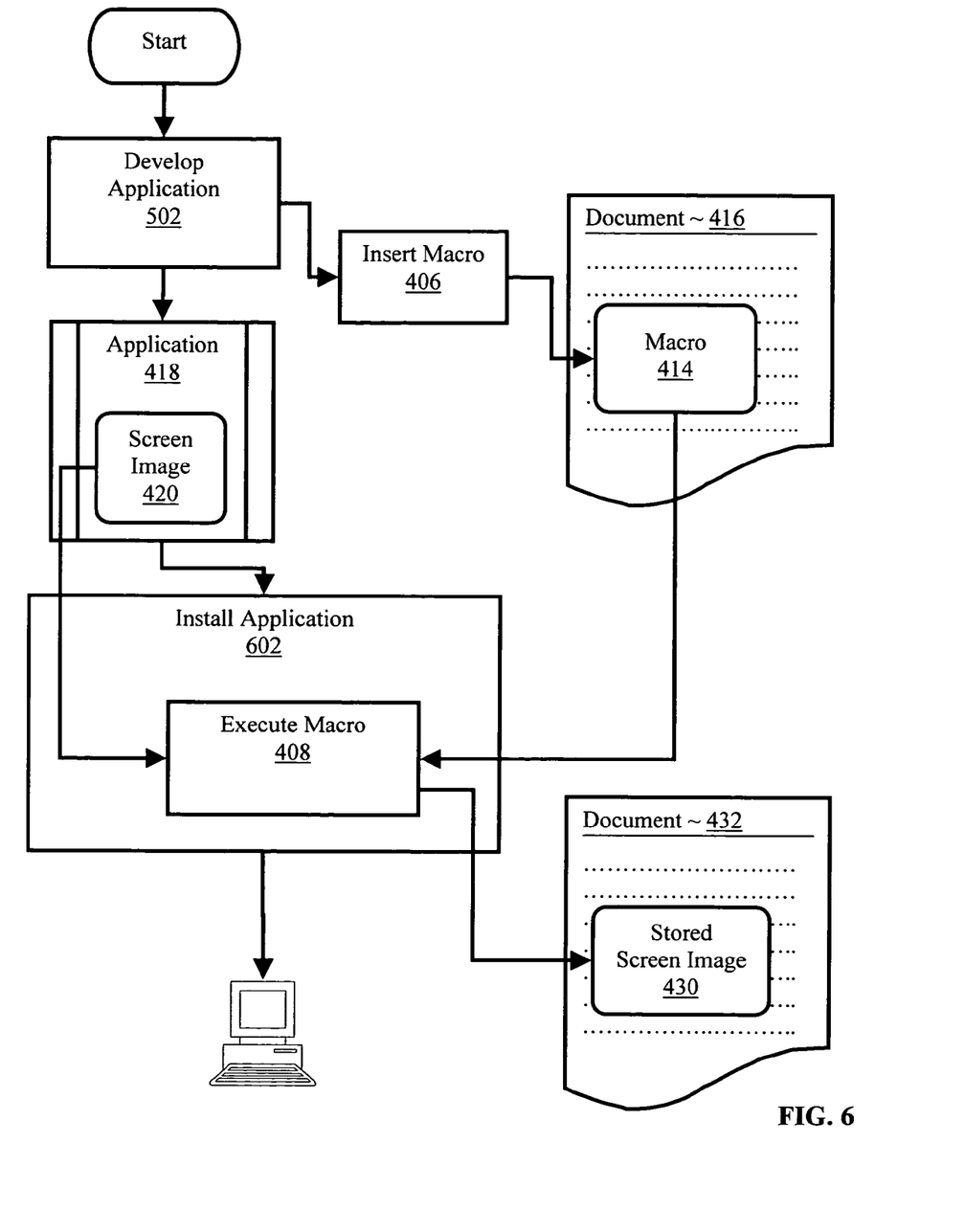
FIG. 6 sets forth a flow chart illustrating a still further exemplary method for inserting into a document at least one screen image of a computer software application.

For further explanation, FIG. 6 sets forth a flow chart illustrating a still further exemplary method for inserting into a document at least one screen image (420, 430) of a computer software application (418) that includes developing (502) a software application (418), inserting (406) a macro (414) at a location in a document (416) for a screen image (420), and executing (408) the macro (414) to navigate to, capture, and store the screen image (420, 430) in a document (432). The method of FIG. 6 also includes installing (602) the computer software application, and, in the example of FIG. 6, executing (408) the macro is carried out by executing the macro when the computer software application is installed. In many embodiments of the present invention, installing the computer software application also includes updating the computer software application, and in many such embodiments, executing the macro is carried out by executing the macro when the computer software application is updated. In the example of FIG. 6, executing (408) the macro may be implemented as a method aspect of an installation script or installation wizard, for example.

Figure 7:
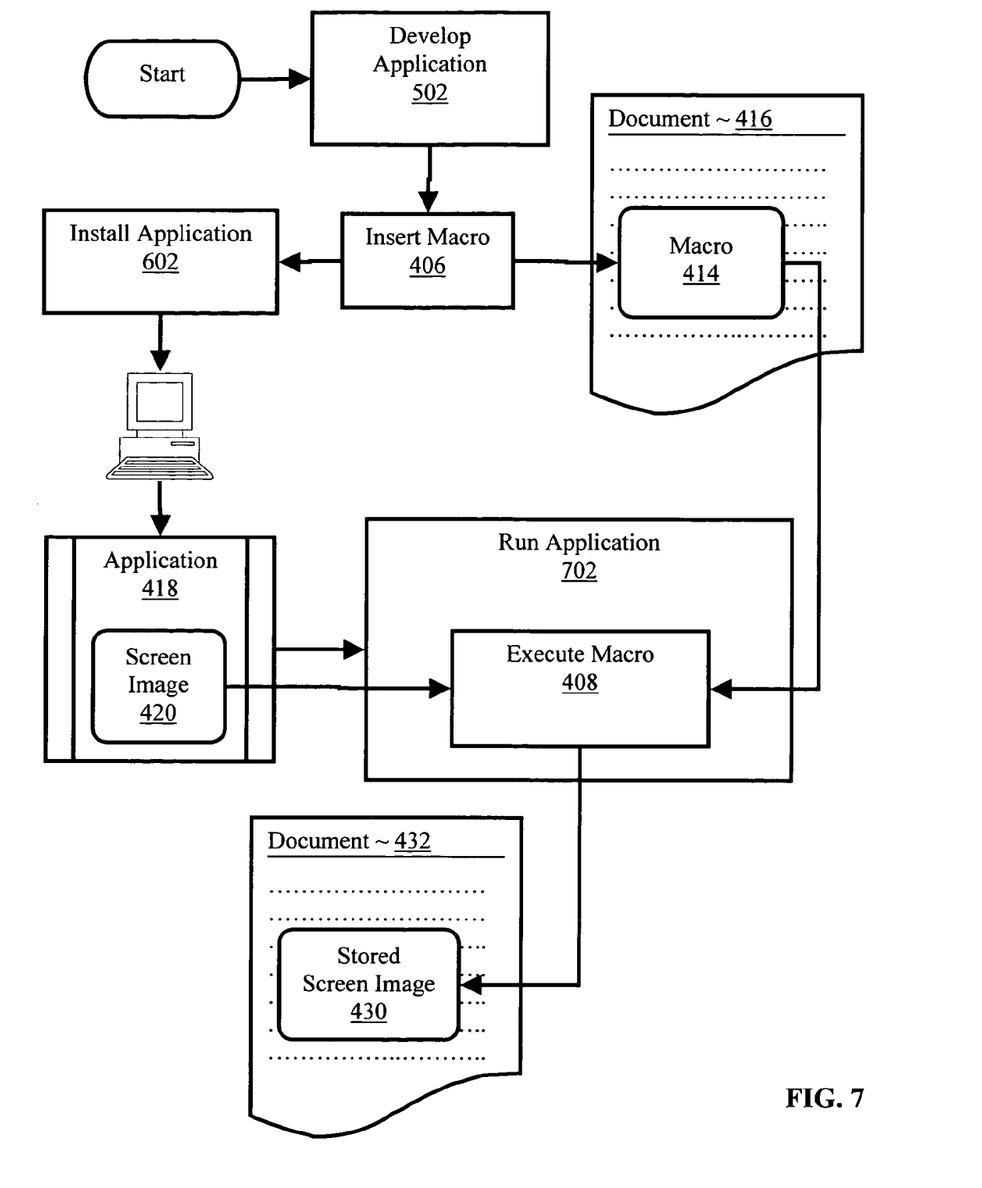
FIG. 7 sets forth a flow chart illustrating an even further method for inserting into a document at least one screen image of a computer software application.

For further explanation, FIG. 7 sets forth a flow chart illustrating an even further exemplary method for inserting into a document at least one screen image (420, 430) of a computer software application (418) that includes developing (502) a software application (418), inserting (406) a macro (414) at a location in a document (416) for a screen image (420), installing (602) the software application, and executing (408) the macro (414) to navigate to, capture, and stored the screen image (420, 430) in a document (432). The method of FIG. 7 also includes running (702) the computer software application, and, in the example of FIG. 7, executing (408) the macro is carried out by executing the macro when the computer software application is run. In the example of FIG. 7, executing (408) the macro may be implemented as a method aspect of an on-line 'Help' system incorporated into the application (418) itself, either programmed in at the source code level or through a plug-in, for example.

In view of the explanations set forth in this specification, readers will now understand that the benefits of inserting screen images into documents according to embodiments of the present invention include:
Reducing the difficulty of creating documentation in multiple languages Reducing the difficulty of keeping documentation product graphics up to date Reducing the maintenance cost of a product documentation because graphic images do not need to be retranslated due to a change in a screen or graphic It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for inserting into a document at least one screen image of a computer software application, the method comprising:
    inserting a macro at a location in the document for the screen image, the macro comprising instructions for navigating the computer software application to the screen image and for capturing the screen image; and
    executing the macro.

2. The method of claim 1 wherein inserting a macro at a location in the document for the screen image further comprises:
    navigating the computer software application to the screen image by a user's operations of user interface controls; and
    capturing the user's operations of user interface controls as instructions for navigating the computer software application to the screen image.

3. The method of claim 1 wherein inserting a macro at a location in the document for the screen image further comprises entering by a user, in the document at the location, the instructions for navigating the computer software application to the screen image.

4. The method of claim 1 wherein executing the macro further comprises:
    navigating, according to the macro, the computer software application to the screen image; and
    storing the screen image in computer memory.

5. The method of claim 1 wherein executing the macro further comprises executing the macro for a language in dependence upon regional configuration settings.

6. The method of claim 1 further comprising developing the computer software application, wherein executing the macro further comprises executing the macro when the computer software application is developed.

7. The method of claim 1 further comprising installing the computer software application, wherein executing the macro further comprises executing the macro when the computer software application is installed.

8. The method of claim 1 further comprising running the computer software application, wherein executing the macro further comprises executing the macro when the computer software application is run.

9. A system for inserting into a document at least one screen image of a computer software application, the system comprising a processor and computer memory operatively coupled to the processor, the computer memory comprising computer program instructions capable of:
    inserting a macro at a location in the document for the screen image, the macro comprising instructions for navigating the computer software application to the screen image and for capturing the screen image; and
    executing the macro.

10. The system of claim 9 wherein inserting a macro at a location in the document for the screen image further comprises:
    navigating the computer software application to the screen image by a user's operations of user interface controls; and
    capturing the user's operations of user interface controls as instructions for navigating the computer software application to the screen image.

11. The system of claim 9 wherein inserting a macro at a location in the document for the screen image further comprises entering by a user, in the document at the location, the instructions for navigating the computer software application to the screen image.

12. The system of claim 9 wherein executing the macro further comprises:
    navigating, according to the macro, the computer software application to the screen image; and
    storing the screen image in computer memory.

13. The system of claim 9 wherein executing the macro further comprises executing the macro for a language in dependence upon regional configuration settings.

14. The system of claim 9 wherein the computer memory comprises computer program instructions capable of developing the computer software application, wherein executing the macro further comprises executing the macro when the computer software application is developed.

15. A computer program product for inserting into a document at least one screen image of a computer software application, the computer program product comprising:
    a recording medium;
    means, recorded on the recording medium, for inserting a macro at a location in the document for the screen image, the macro comprising instructions for navigating the computer software application to the screen image and for capturing the screen image; and
    means, recorded on the recording medium, for executing the macro.

16. The computer program product of claim 15 wherein means, recorded on the recording medium, for inserting a macro at a location in the document for the screen image further comprises:
    means, recorded on the recording medium, for navigating the computer software application to the screen image by a user's operations of user interface controls; and
    means, recorded on the recording medium, for capturing the user's operations of user interface controls as instructions for navigating the computer software application to the screen image.

17. The computer program product of claim 15 wherein means, recorded on the recording medium, for inserting a macro at a location in the document for the screen image further comprises means, recorded on the recording medium, for entering by a user, in the document at the location, the instructions for navigating the computer software application to the screen image.

18. The computer program product of claim 15 wherein means, recorded on the recording medium, for executing the macro further comprises:
    means, recorded on the recording medium, for navigating, according to the macro, the computer software application to the screen image; and
    means, recorded on the recording medium, for storing the screen image in computer memory.

19. The computer program product of claim 15 wherein means, recorded on the recording medium, for executing the macro further comprises means, recorded on the recording medium, for executing the macro for a language in dependence upon regional configuration settings.

20. The computer program product of claim 15 further comprising means, recorded on the recording medium, for developing the computer software application, wherein means, recorded on the recording medium, for executing the macro further comprises means, recorded on the recording medium, for executing the macro when the computer software application is developed.

* * * * *